(12) United States Patent
Branagan

(10) Patent No.: US 7,205,032 B2
(45) Date of Patent: Apr. 17, 2007

(54) CONTROLLED THERMAL EXPANSION OF WELDS TO ENHANCE TOUGHNESS

(75) Inventor: Daniel James Branagan, Idaho Falls, ID (US)

(73) Assignee: The NanoSteel company, Inc., Providence, RI (US)

( * ) Notice: Subject to any disclaimer, the term of this patent is extended or adjusted under 35 U.S.C. 154(b) by 315 days.

(21) Appl. No.: 10/816,094

(22) Filed: Apr. 1, 2004

(65) Prior Publication Data
US 2005/0000673 A1    Jan. 6, 2005

Related U.S. Application Data

(60) Provisional application No. 60/459,341, filed on Apr. 1, 2003.

(51) Int. Cl.
*B05D 1/08* (2006.01)
*C23C 4/08* (2006.01)
*B23K 28/00* (2006.01)

(52) U.S. Cl. .................. 427/446; 427/456; 228/199

(58) Field of Classification Search .................. None
See application file for complete search history.

(56) References Cited

U.S. PATENT DOCUMENTS

| | | | | |
|---|---|---|---|---|
| 2,464,591 A | * | 3/1949 | Larsen et al. | 228/198 |
| 4,101,715 A | * | 7/1978 | Rairden, III | 428/652 |
| 4,234,119 A | * | 11/1980 | Masaoka et al. | 228/125 |
| 4,609,577 A | * | 9/1986 | Long | 428/683 |
| 4,624,402 A | * | 11/1986 | Pitcairn et al. | 228/119 |
| 4,642,446 A | | 2/1987 | Pennington | 219/121 LD |
| 5,034,284 A | * | 7/1991 | Bornstein et al. | 428/680 |
| 5,183,991 A | | 2/1993 | Arai | 219/121.64 |
| 5,183,992 A | | 2/1993 | Bilge et al. | 219/121.64 |
| 5,535,838 A | * | 7/1996 | Keshavan et al. | 175/374 |
| 6,280,796 B1 | * | 8/2001 | Kloft et al. | 427/456 |
| 6,749,894 B2 | * | 6/2004 | Subramanian et al. | 427/239 |
| 2005/0069650 A1 | * | 3/2005 | Darolia et al. | 427/446 |
| 2005/0161816 A1 | * | 7/2005 | Kanda | 257/738 |

OTHER PUBLICATIONS

International Search Report for application No. PCT/US04/10035 mailed Oct. 8, 2004 (6 pgs).

* cited by examiner

*Primary Examiner*—Lynne R. Edmondson
(74) *Attorney, Agent, or Firm*—Grossman Tucker Perreault & PFleger, PLLC

(57) ABSTRACT

A method is provided for forming a metallic overlay having enhanced toughness. The metallic overlay may be a weld, a metallic coating, or similar application. The method includes applying a glass forming metallic alloy to a substrate while the alloy is in a molten or semi-molten state. At the interface of the metallic alloy overlay and the substrate the substrate metal becomes at least partially molten and combines with the alloy to form metallurgical bonds. When the metallic alloy cools it experiences a high relative degree of thermal contraction. The metallurgical bonds between the substrate and the alloy constrain the contraction of the alloy at the interface with the substrate. This results in the inducement of compressive stresses in the metallic alloy overlay. The induced compressive stresses inhibit the formation of cracks in the overlay and/or mitigation of the effects of any cracks in the overlay.

13 Claims, 3 Drawing Sheets

CONTROLLED THERMAL EXPANSION OF WELDS TO ENHANCE TOUGHNESS

CROSS REFERENCE TO RELATED APPLICATIONS

This application claims priority to U.S. Provisional Application No. 60/459,341 filed Apr. 1, 2003.

FIELD OF THE INVENTION

The present invention is directed at a toughening mechanism for improving the properties and performance of weld-type overlays. The toughness of the weld-type overlay is improved by controlling the thermal contraction of the weld overlay during cooling. The increased toughness weld-type overlays of the present invention may be utilized in many application including hardfacing, wear/overlay plate, as well as the rebuild and repair of metal parts.

BACKGROUND OF THE INVENTION

Often with conventional materials, there is an inverse relationship between hardness and toughness. Generally, as the hardness of the material increases there will be a corresponding, though not necessarily proportional, decrease in the toughness of the material. On reason for this inverse relationship is because the mechanism of dislocation movement has a significant effect on both the hardness and the toughness of a conventional material. When defects are introduced into a material, the defects may tie-up dislocations, thereby preventing the material from yielding. This mechanism makes the material both harder and stronger. Conversely, removing defects from a material allows dislocations to move freely on their slip plane and slip direction producing a greater degree of ductility. From a general standpoint, resistance to cracking (i.e. toughness) will be determined by the material's ductility because stress concentrations in front of a crack tip will create a plastic zone which blunts the crack tip, reducing the stress concentration factor, thus preventing growth of the crack.

While the thermal spray coatings industry is a mature industry and the application of a high performance coatings have long been used to dramatically improve the lifetime of a part, there are many military and industrial applications for which a thermal spray coatings approach is not sufficient to solve wear problems. Problematic applications often involve heavy loads, high stress point loads, heavy impact, and gouging abrasion of the coated part. Additionally, while thermal spray may be used for limited cases in the rebuild and repair of parts, weld on techniques will generally be necessary.

Accordingly, it is an object of the present invention to provide the most efficient balance of hardness and toughness in a metallic coating, so that, in a given application, both parameters may be uniquely optimized to improve the lifetime of a part to both wear and impact type phenomena.

SUMMARY OF THE INVENTION

In a first embodiment the present invention is directed at a method for forming a metallic overlay comprising supplying a metal substrate with a thermal expansion coefficient "X", supplying a metal alloy which has a thermal expansion coefficient "Y", wherein Y>X, melting said metal alloy and applying said metallic alloy to said metal substrate to form an alloy/substrate interface, forming metallurgical bonds between said metallic alloy and said substrate at said alloy/substrate interface, and causing said alloy to shrink while said alloy is constrained at said alloy/substrate interface thereby developing a residual compressive stress in said metallic alloy.

In a second embodiment the present invention is directed at a method for forming a metallic overlay comprising supplying a metal substrate with a thermal expansion coefficient "X", supplying a metal alloy which has a thermal expansion coefficient "Y", wherein Y>X and wherein said metal alloy has a yield strength "Z", melting said metal alloy and applying said metallic alloy to said metal substrate to form an alloy/substrate interface, forming metallurgical bonds between said metallic alloy and said substrate at said alloy/substrate interface, and causing said alloy to shrink while said alloy is constrained at said alloy/substrate interface thereby developing a residual compressive stress in said metallic alloy, wherein said compressive stress does not exceed the yield strength "Z".

In a third embodiment the present invention is directed at a method for forming a metallic overlay comprising supplying a metal substrate with a thermal expansion coefficient "X", supplying a metal alloy which has a thermal expansion coefficient "Y", wherein Y>X and wherein said metal alloy has a yield strength "Z", melting said metal alloy and applying said metallic alloy to said metal substrate to form an alloy/substrate interface, forming metallurgical bonds between said metallic alloy and said substrate at said alloy/substrate interface, and causing said alloy to shrink while said alloy is constrained at said alloy/substrate interface thereby developing a residual compressive stress in said metallic alloy, wherein said compressive stress does not exceed the yield strength "Z" and wherein said metal alloy has a hardness of greater than about 850 $kg/mm^2$.

In yet another embodiment the present invention is directed at a method for forming a metallic overlay comprising supplying a metal substrate, supplying a metal alloy, melting said metal alloy and applying said metallic alloy to said metal substrate to form an alloy/substrate interface, forming metallurgical bonds between said metallic alloy and said substrate at said alloy/substrate interface, causing said alloy to cool to provide said alloy with a fracture toughness greater than 200 MPa $m^{1/2}$ and a hardness greater than 5 GPa.

BRIEF DESCRIPTION OF THE DRAWINGS

An understanding of the invention herein, including objects, features, and advantages is provided by a description of specific exemplary embodiments thereof, which description should be read and understood in conjunction with the accompanying figures, wherein.

DETAILED DESCRIPTION OF PREFERRED EMBODIMENTS

Figure 1:
FIG. 1 shows photographs of an arc melted ingot of Alloy A before (on the left) and after (on the right) being hit with a moderate blow from a ball peen hammer.

The present invention is a method of providing a metallic overlay to a substrate that has improved toughness. The method involves a mechanism of developing compressive stresses in the metal material after cooling (residual compressive stress). The induced residual compressive stress due to shrinkage both prevents cracks from forming and acts to close the tip of any cracks that form. By preventing or mitigating cracks in the metallic overlay it is possible to significantly reduce the stress concentration factor experienced at the crack tips.

As used herein, the tem "weld overlay" refers to a metallic material that has been applied to a substrate in an at least partially molten state. Furthermore, the term weld overlay contemplates a fused interface between the metallic material and the substrate, such that there is at least partial metallurgical bonding between the metallic material and the substrate. Metallurgical bonding includes a chemical bonding interaction forming metallic-type chemical bonds between the metallic material and the substrate.

Accordingly, a weld overlay may include, but is not limited to metallic material applied in a welding process, a thermal spray metal coating, in which a molten or semi-molten metal is sprayed onto a substrate, or a fused coating in which a metallic coating is heated and caused to fuse to the substrate. Various other coating types and methods will be understood in which a metallic material is at least partially fused to a substrate from a molten or semi-molten state thereby forming metallurgical bonds with the substrate.

Similarly, it should be understood that weld material refers to any metallic material that is applied in a manner contemplated hereinabove and/or applied forming metallurgical bonds with a substrate or base consistent with the present invention. Generally these metallic materials may be classified as glass forming metallic alloys. Most especially, suitable metallic glasses may be iron based glass forming alloys. These suitable alloys exhibit high hardness and yield strength and will have the ability to form glasses at high cooling rates. However, actual glass formation is not a priori since there are cases where the glass forming region is just missed during solidification but a high level of undercooling is achieved. This undercooling can provide a large driving force to aid in the rapid transformation to a nanoscale structure. Exemplary compositions could include any base metal with sufficiently high glass forming ability and sufficiently high thermal expansion.

The present invention recognizes that when, e.g., glass forming alloys are welded they can be made to experience greater contraction on cooling as compared to a conventional steel substrate. During welding, intricate mixing occurs between the weld material and the base metal, and a full, or at least partial, metallurgical bond may be formed from the liquid melt and may be subsequently maintained during cooling. As the weld material cools it shrinks in all directions but it is constrained in at least one direction by the intimate contact/metallurgical bonding with the base metal. Therefore, as the weld deposit is cooled it contracts to a higher degree than the base metal/substrate and, therefore, solidifies into a state having high compressive residual stress. This favorable residual stress prevents cracks from forming and/or propagating in the weld material. In addition, these built up and retained compressive stresses inhibit the formation of cracks in the weld material, and thereby increase the toughness of the weld material.

The development of residual stress as disclosed herein has not been observed to occur in conventional metals to the same degree. When conventional weld material solidifies, if there are large differences in coefficient of thermal expansion between the weld material and the substrate large localized stresses may arise. If these localized stresses exceed the yield strength of the weld material plastic flow of the material may occur which acts to release or relieve the residual stress. If the plasticity or total elongation of the weld material is exceeded in a localized area, crack formation may be initiated.

In addition to being able to form high residual compressive stress, the present invention utilizes the unique ability of glass forming alloys to retain such residual stress upon solidification. One aspect of this is the high yield strengths found in this class of materials. For example, measured yield strengths for iron based glass forming alloys can be as high as 3000 MPa at room temperature and as high as 1800 MPa at 700° C. By comparison, it should be noted that "Ultra High Strength Steels" may generally have room temperature yield strengths in the 1380–1520 MPa range. At 700° C. the above alloy exhibits a higher yield strength than so called ultra high strength steels present at room temperature. The higher yield strengths of iron based glasses support the understanding that high residual compressive stress is maintained in the weld deposits, but the stress does not exceed the yield strength of the weld material, i.e. the stress interacts in the elastic range of the material. Utilizing these findings, coatings, welds, etc. can be provided in which both plastic deformation and cracking phenomena may be avoided and high residual compressive stress is maintained.

According to the present invention a metallic glass may be deposited on a substrate, for example as a weld or thermal spray coating. Using such techniques, the metallic glass is deposited in a molten or semi-molten state. The heat of the metallic glass being deposited and/or additional processing conditions may cause at least a portion of the surface of the substrate to achieve a molten or semi-molten state as well. Desirably the metallic glass being deposited will at least partially fuse to the substrate, forming metallurgical bonds between the metallic glass and the substrate. As the metallic glass cools from the as-applied molten or semi-molten state it experiences thermal shrinkage that is relatively high. The key is that the thermal expansion of the referenced metallic glass has a higher thermal expansion coefficient than the base substrate material, preferably at least about 15.0% higher. The metallurgical bonding between the substrate and the metallic glass restricts the shrinkage of the metallic glass along the interface thereof. As a result, high compressive stresses are induced in the metallic glass. The overall effect may be somewhat analogous to shot peening or hammer forging, although the mechanism are distinguishable.

As alluded to above, the present invention is susceptible to use in a variety of approaches involving weld processing, or similar processing involving the formation of metallurgical bonds between, preferably, a glass forming alloy and a substrate. Suitable processes may include Plasma Transferred Arc (PTA) welding, Metal Inert Gas (MIG) welding, Laser Engineered Net Shape (LENS), Shielded Metal Arc Welding (SMAW), Powder Welding, and Gas Tungsten Arc Welding (GTAW). These exemplary processes may utilize a powder feedstock, a flexible wire feedstock, or a solid wire feedstock. However, the form of the feedstock or the exact process used is not a limiting aspect for this invention.

The invention herein accordingly pertains to improved toughness of a weld overlay. In that regard, it is worth noting that the hardness of the weld overlay will be dependant on a variety of factors including the microstructure scale, the level of supersaturation of alloying elements, and resistance of specific grain boundary pairs to resist grain boundary sliding and grain boundary rotation.

EXPERIMENTAL EXAMPLES

Four experimental alloys were produced having the compositions detailed in Table 1 using generally conventional alloying techniques. The metallic alloys were provided as cored wire having a diameter of 1/16". The cored wire of the various alloys were processed using a MIG (metal inert gas) welding apparatus operating at 32V and 250A with a welding gas shield consisting of 98% Ar-2% $O_2$ to produce sample hardfacing deposits which were deposited onto various plain carbon and alloy steel substrates.

TABLE 1

Alloy Designations and Compositions.

| Alloys | Compositions (Wt %) |
|---|---|
| Alloy A | 78.1 Fe, 9.2 Cr, 4.3 Mo, 4.1 B, 1.3 C, 0.6 Si, and 2.4 Al |
| Alloy B | 65.9 Fe, 25.3 Cr, 1.0 Mo, 1.8 W, 3.5 B, 1.2 C, 0.5 Si, 0.8 Mn |
| Alloy C | 64.9 Fe, 26.0 Cr, 1.0 Mo, 1.4 W, 3.6 B, 1.2 C, 1.0 Si, 0.8 Mn |
| Alloy D | 68.0 Fe, 23.2 Cr, 1.2 Mo, 1.5 W, 3.6 B, 0.9 C, 0.7 Si, 0.8 Mn |

As a first experimental test, the hardness of welds produced using Alloy B and Alloy C were determined using Rockwell C hardness testing. Welds produced using wire stock from Alloy B and Alloy C were found to have unexpectedly high hardnesses of $R_c=62$ and $R_c=65$, respectively. Additionally, Alloy C and Alloy D were tested to determine the Vickers hardness. As with the Rockwell C hardness of Alloy B and Alloy C, the Vickers hardness of weld deposits formed from Alloy C and Alloy D proved unexpectedly high, exhibiting values of 950 kg/mm² and of 1100 kg/mm² respectively.

The toughness of the alloys was experimentally evaluated using a hammer or hammer and chisel to apply direct blows to the substrate that had been hardfaced with weld deposits of the experimental alloys. Generally, it had previously been observed that alloys having the compositions detailed in Table 1 have very low toughness in ingot form. For example, one moderate blow from a ball peen hammer may often cause the ingots to crack apart. Such a typical result is shown in FIG. 1, in which an ingot of Alloy A, formed by arc-melting, is shown before (on the left) and after (on the right) being stricken with a moderate blow from a ball peen hammer. In contrast to the expected result, weld deposits of the experimental alloys exhibit much higher toughness. In experimental evaluation, repeated hammer strikes to a weld-deposit hardface coating of the experimental alloys failed to produce any observable cracking of the weld deposits. Furthermore, repeated (>50) blows with a hammer and chisel resulted in only very small amounts of material being removed from the weld, at most much less than one gram. During testing, 4 different tool steel chisels were flattened and repeatedly sharpened and then reflattened as a result of striking the weld material.

In addition to the hammer and chisel tests, which were remarkable, a sample cross section of an Alloy C weld deposit was tested for toughness using the Palmqvist Technique. During the Palmqvist testing, the indentation load was initially set to be 2 Kg, and was subsequently increased up to a 90 Kg load. No cracking was observed in the weld deposit even up to the maximum testing load of 90 Kg. Since no cracking was observed in the Alloy weld, it was not possible to obtain a numerical measure of toughness using the Palmqvist technique. However, it may still be possible to use the Palmqvist technique to estimate a lower limit to the fracture toughness by assuming a mean radial crack length on the general order of $10^{-7}$ m to $10^{-8}$ m, which is below the resolution of an optical microscope ($10^{-6}$ m). Using this assumption, the estimated lower limit of fracture toughness of the Alloy C weld deposit would be in the range of 22 to 70 MPam$^{1/2}$.

By way of comparison, relevant literature, for example D. K. Shetty, I. G. Wright, P. N. Mincer and A. H. Clauer, J. Mater. Sci. 20, 1873, (1985), has revealed that cemented tungsten carbide begins cracking during Palmqvist testing at much smaller indentations loads, approximately on the order of 2.5 Kg. Also, the literature indicates that the expected mean radial crack length for cemented tungsten carbides at an applied 90 Kg load could be estimated to be approximately 1000 microns. It should be noted that the Palmqvist method of measuring Fracture Toughness is well established in the weld on hardfacing and sintered carbide industries and is the industry standard to measure toughness. Based on previous studies, the Palmqvist toughness can be correlated fairly accurately to the plain strain fracture toughness ($K_{1c}$). See, for example, D. K. Shetty, I. G. Wright, P. N. Mincer and A. H. Clauer, J. Mater. Sci. 20, 1873, (1985); and G. R. Anstis, P. Chantikui, B. R. Lawn and D. B. Marshall, J. Am Ceram. Soc. 64, 533, (1981).

Figure 4:
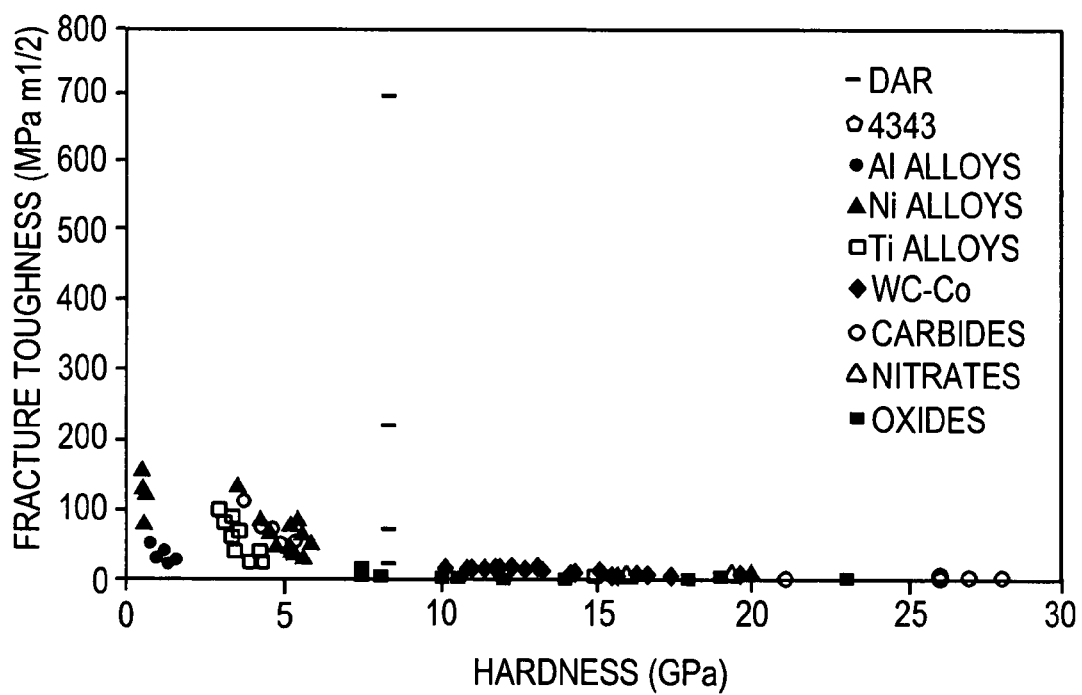
FIG. 4 is a plot of toughness versus hardness showing the hardness/toughness of Alloy C compared to published results for exemplary iron alloys, aluminum alloys, nickel alloys, carbides, nitrides, and oxides.

Referring to FIG. 4 the toughness versus hardness for a variety of materials including iron alloys, aluminum alloys, nickel alloys, carbides, nitrides, and oxides is shown. As shown, the general inverse relationship between hardness and toughness is observed. On the plot, it can be seen that the Alloy C weld (indicated as DAR), occupies a new material regime, with novel combinations of toughness and hardness. As can be seen in FIG. 4, Alloy C not only exhibits uniquely high fracture toughness, but the high fracture toughness is achieved without an attendant decrease in hardness. Table 2 through Table 10 below present the data of FIG. 4 in tabular format.

TABLE 2

Hardness and Fracture Toughness for Selected Oxides.

| Oxide Compound | Hardness (GPa) | Fracture (MPa(m)1/2) |
|---|---|---|
| Al2O3 | 26 | 2 |
| Al2O3 | 19 | 6 |
| Al2O3 | 23 | 4 |
| MgO | 8 | 2.5 |
| MgAlO4 | 18 | 1.9 |
| MgAlO4 | 14 | 2.4 |
| Mullite | 15 | 3 |
| ThO2 | 10 | 1.6 |
| Y2O3 | 8 | 1.5 |
| ZrO2 | 15 | 3 |
| ZrO2 | 12 | 3.6 |
| ZrO2 | 7.4 | 9 |
| TiO2 | 7.4 | 1.4 |
| TiO2 | 10.5 | 1.9 |

TABLE 3

Hardness and Fracture Toughness for Selected Carbides.

| Carbides | Hardness (GPa) | Fracture (MPa(m)1/2) |
|---|---|---|
| SiC | 26 | 6 |
| SiC | 36 | 3 |
| SiC | 27 | 4 |
| SiC | 19.3 | 4 |
| SiC | 21.1 | 3.1 |
| TiC | 28 | 3 |
| TiC | 16 | 5 |
| BC | 72.2 | 6 |

TABLE 4

Hardness and Fracture Toughness for Selected Nitrides.

| Nitrides | Hardness (GPa) | Fracture (MPa(m)1/2) |
|---|---|---|
| Si3N4 | 30 | 3 |
| Si3N4 | 17 | 10 |
| Si3N4 | 14.1 | 4.9 |

TABLE 5

Hardness and Fracture Toughness for Selected Tungsten Carbides.

| WC—Co | Hardness (GPa) | Fracture (MPa(m)1/2) |
|---|---|---|
| WC—Co | 16.72 | 9.4 |
| WC—Co | 16.33 | 9.3 |
| WC—Co | 14.93 | 9.9 |
| WC—Co | 11.77 | 13.1 |
| WC—Co | 16.87 | 7.7 |
| WC—Co | 15.06 | 8.1 |
| WC—Co | 16.75 | 9.6 |
| WC—Co | 19.61 | 8.9 |
| WC—Co | 14.09 | 9.5 |
| WC—Co | 14.27 | 9.3 |
| WC—Co | 15.3 | 8.2 |
| WC—Co | 13.3 | 10 |
| WC—Co | 15.7 | 7.6 |
| WC—Co | 17.46 | 6.4 |
| WC—Co | 19.84 | 5.1 |
| WC—Co | 13.29 | 9.9 |
| WC—Co | 16.84 | 6.9 |
| WC—Co | 15.58 | 7.8 |
| WC—Co | 12.74 | 11.6 |
| WC—Co | 12.33 | 12.2 |
| WC—Co | 11.37 | 14.5 |
| WC—Co | 11.46 | 14.1 |
| WC—Co | 10.84 | 15.5 |
| WC—Co | 10.92 | 15.2 |
| WC—Co | 11.86 | 13.3 |
| WC—Co | 11.96 | 12.9 |
| WC—Co | 11.045 | 14.5 |
| WC—Co | 10.09 | 17.1 |
| WC—Co | 13.2 | 16 |

TABLE 6

Hardness and Fracture Toughness for Selected Titanium Alloys.

| Ti Alloy | Hardness (GPa) | Fracture (MPa(m)1/2) |
|---|---|---|
| Ti—5Al—2.5Sn | 3.136 | 76.93 |
| Ti—6Al—2Cb—1Ta—1Mo | 2.94 | 98.91 |
| Ti—8Al—1Mo—1V | 3.43 | 65.94 |

TABLE 6-continued

Hardness and Fracture Toughness for Selected Titanium Alloys.

| Ti Alloy | Hardness (GPa) | Fracture (MPa(m)1/2) |
|---|---|---|
| Ti—6Al—4V | 3.626 | 65.94 |
| Ti—6Al—6V—2Sn | 3.332 | 60.445 |
| Ti—6Al—6V—2Sn | 4.312 | 24.178 |
| Ti—6Al2Sn4Zr—6Mo | 3.43 | 36.267 |
| Ti—6Al2Sn4Zr—6Mo | 3.92 | 24.178 |
| Ti—13V—11Cr—3Al | 3.332 | 87.92 |
| Ti—13V—11Cr—3Al | 4.214 | 38.465 |

TABLE 7

Hardness and Fracture Toughness for Selected Aluminum Alloys.

| Al Alloys | Hardness (GPa) | Fracture (MPa(m)1/2) |
|---|---|---|
|  | 1.323 | 23.2 |
|  | 0.931 | 29.1 |
|  | 1.2054 | 32.3 |
|  | 1.47 | 22.5 |
| 2014 | 1.323 | 18.683 |
| 2024 | 1.176 | 28.574 |
| 2219 | 1.274 | 36.267 |
| 5086 | 0.7056 | 49.455 |
| 6061 | 0.931 | 28.574 |
| 7075 | 1.47 | 20.881 |

TABLE 8

Hardness and Fracture Toughness for Selected Steel Alloys.

| Steel Alloy | Hardness (GPa) | Fracture (MPa(m)1/2) |
|---|---|---|
|  | 3.724 | 109.9 |
|  | 4.214 | 74.732 |
|  | 5.39 | 52.752 |
|  | 4.9 | 48.356 |
|  | 4.606 | 71.435 |
|  | 2.2442 | 64.841 |
|  | 4.802 | 71.435 |

TABLE 9

Hardness and Fracture Toughness for Selected Nickel Alloys.

| Ni Alloy | Hardness (GPa) | Fracture (MPa(m)1/2) |
|---|---|---|
|  | 5.096 | 38.465 |
|  | 5.488 | 29.673 |
|  | 5.194 | 76.93 |
|  | 5.488 | 60.445 |
|  | 5.096 | 46.158 |
|  | 4.508 | 65.94 |
|  | 5.292 | 32.97 |
|  | 4.606 | 65.94 |
|  | 4.214 | 82.425 |
|  | 3.528 | 131.88 |
|  | 4.704 | 49.455 |
|  | 5.39 | 74.732 |
|  | 5.39 | 79.128 |
|  | 5.8016 | 49.455 |
|  | 0.441 | 155 |
|  | 0.4704 | 120 |
|  | 0.4998 | 80 |
|  | 0.4214 | 125 |

TABLE 10

Hardness and Fracture Toughness for Selected DAR Alloys.

| DAR Alloy | Hardness (GPa) | Fracture (MPa(m)1/2) |
|---|---|---|
| DAR | 8.3 | 22.28413 |
|  | 8.3 | 70.46859 |
|  | 8.3 | 222.8413 |
|  | 8.3 | 704.6859 |

Additional testing of the experimental alloys included differential scanning calorimetry (DSC) of Alloy B. The DSC analysis indicated that the alloy contained at least a small fraction of glass. The presence of the glass fraction was indicated by a peak at approximately 615° C., which is the temperature of the metallic glass transition for an alloy of the tested composition. Both Alloy C and Alloy D were also designed to have an increased glass forming ability compared to Alloy B.

Figure 2:
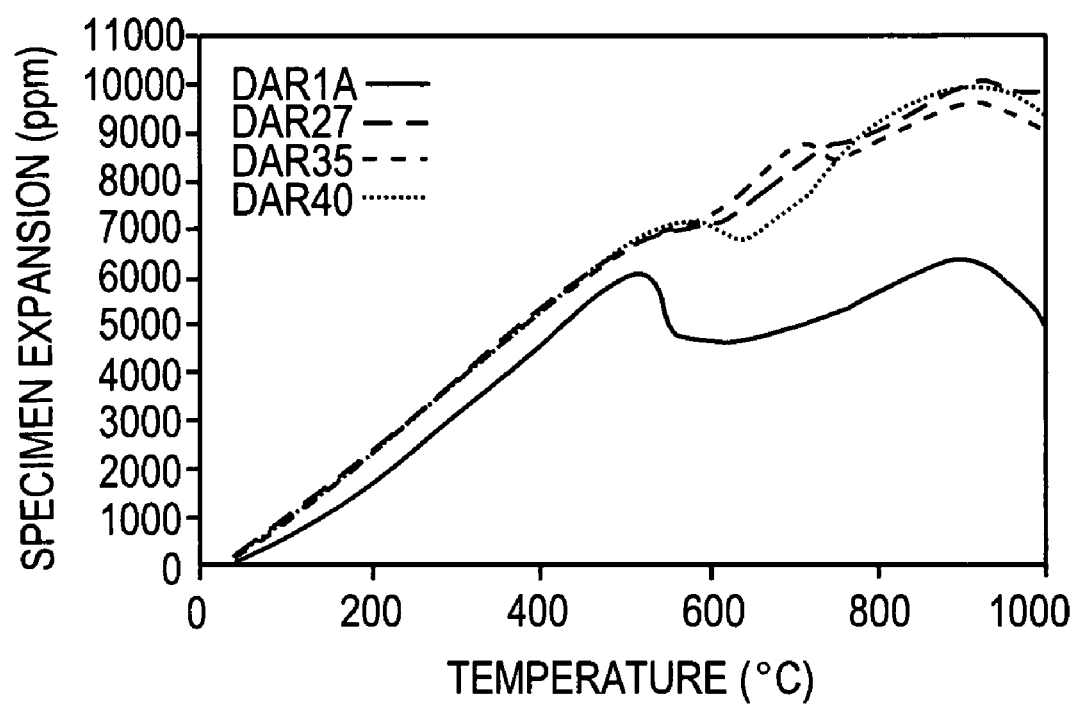
FIG. 2 is a plot of thermal expansion for high velocity oxy-fuel coupons of Alloy A, Alloy B, Alloy C, and Alloy D.
Figure 3:
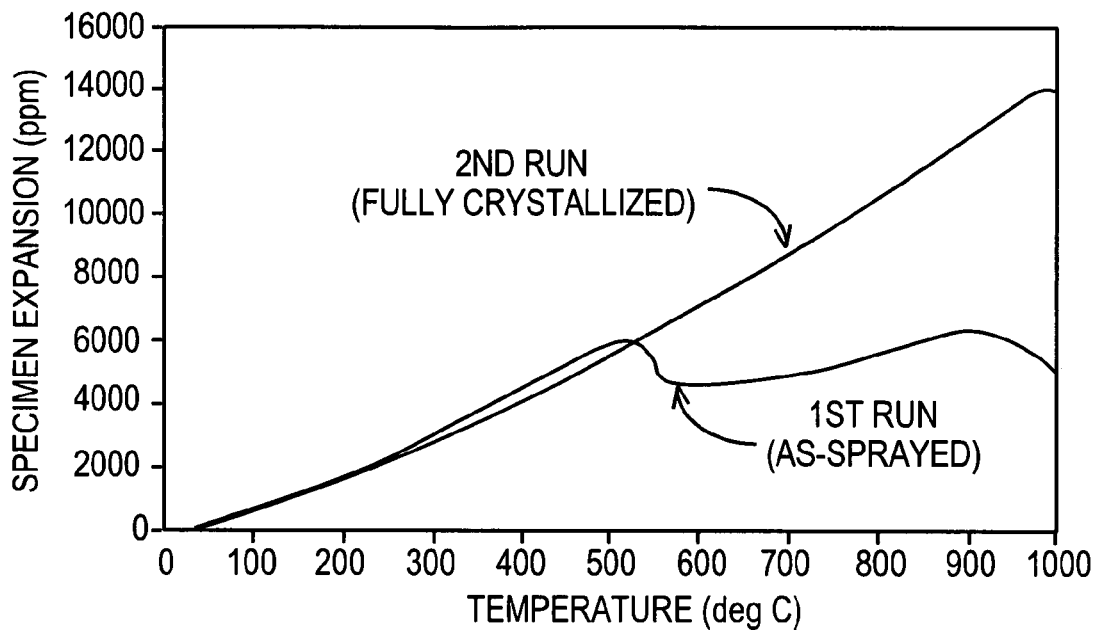
FIG. 3 is a plot of thermal expansion of a coupon of Alloy A up to a temperature of 1000° C., both of an as-sprayed sample and of a fully crystallized sample.

The experimental examples discussed above indicate that the MIG weld-deposited alloys consistent with the present invention have a high degree of toughness and a high level of hardness. At the time of filing, it is believed that this toughness is related to the differential thermal expansion of the weld-deposited material as compared to the substrate on which the material is deposited. This theory was based on testing of the thermal expansion of selected iron based glass forming alloys which were measured over the temperature range of 20–1000° C. The tests of thermal expansion were conducted using a Theta Industries Dilamatic II dilatometer on coupons of the alloys produced by high velocity oxy-fuel spraying. The experimentally determined thermal expansion of the alloys versus temperature is shown in FIG. 2. In this plot, it is noted that the reduction in slope found in each alloy was verified to be the result of the volume reduction which occurs when the glass crystallizes as shown in FIG. 3. It was noted that the beginning of the reduction in slope for each alloy corresponds to the glass crystallization temperatures for each respective alloy.

Referring to FIG. 3, a plot of the thermal expansion of the Alloy A versus temperature is shown, both for an as-sprayed test specimen and for a specimen that had been completely crystallized prior to testing. It can be seen from this plot that the completely crystallized specimen did not experience a reduction in expansion with increasing temperature because the specimen was free of glass.

Based on the above experiments, it was found that the glass forming steel alloys exhibit relatively high thermal expansions. The test results of thermal expansion coefficients for the experimental alloys compared to several commercial steel alloys are listed in Table 11. It can be seen that these specialized iron based glass forming alloys have much higher thermal expansion coefficients than many conventional iron based alloys, as reported in William D. Callister, Jr., *Materials Science and Engineering*, John Wiley & Sons, New York, 1994.

TABLE 11

Coefficient of Thermal Expansion for Various Alloys (100 to 500° C.).

| Alloy | CTE (ppm/° C.) |
|---|---|
| Alloy A | 14.34 |
| Alloy B | 14.84 |
| Alloy C | 14.73 |
| Alloy D | 14.75 |
| Iron | 11.8 |

TABLE 11-continued

Coefficient of Thermal Expansion for Various Alloys (100 to 500° C.).

| Alloy | CTE (ppm/° C.) |
|---|---|
| 1020 steel | 11.7 |
| 1080 steel | 11.0 |
| 410 stainless steel | 9.9 |

What is claimed is:

1. A method for forming a metallic overlay comprising:
   supplying a metal substrate with a thermal expansion coefficient "X";
   supplying a metallic alloy which has a thermal expansion coefficient "Y", wherein said metallic alloy has a coefficient of thermal expansion "Y" greater than 15% of that of said substrate "X" and wherein Fe and Cr comprises at least 90 wt % of said metallic alloy, and C is present at levels of about 1.0 wt %, and Mo is present at levels of about 1.0–2.0 wt %;
   melting said metallic alloy and applying said metallic alloy to said metal substrate to form an alloy/substrate interface;
   forming metallurgical bonds between said metallic alloy and said substrate at said alloy/substrate interface; and
   causing said alloy to shrink while said alloy is constrained at said alloy/substrate interface thereby developing a residual compressive stress in said metallic alloy, wherein said metallic alloy has a hardness of greater than 750 kg/mm$^2$.

2. The method of claim 1 wherein said alloy is comprised of a mixture of Fe, Cr, Mo, W, B, C, Si and Mn.

3. The method of claim 2, wherein Fe is present at levels above 50.0 wt %.

4. The method of claim 2, wherein Fe, Cr, Mo, and W comprise at least 90 wt % of said mixture.

5. The method of claim 1 wherein Fe and Cr comprise at least 90 wt. % of said metallic alloy, and Mo is present at levels of about 1.0–2.0 wt. %, and B is present at levels of about 3.0–4.0 wt %, W is present at levels of about 1.0–2.0 wt %, C is present at levels of about 0.1–1.2 wt % Si is present at levels of 0.1–1.0 wt % and Mn is present at levels of 0.1–1.0 wt %.

6. The method according to claim 2 wherein said metallic alloy has a composition of about 65.9 wt % Fe, 25.3 wt % Cr, 1.0 wt % Mo, 1.8 wt % W, 3.5 wt % B, 1.2 wt % C, 0.5 wt % Si, 0.8 wt % Mn.

7. The method according to claim 2 wherein said metallic alloy has a composition of 64.9 wt % Fe, 26.0 wt % Cr, 1.0 wt % Mo, 1.4 wt % W, 3.6 wt % B, 1.2 wt % C, 1.0 wt % Si, 0.8 wt % Mn.

8. The method according to claim 1 wherein said metallic alloy has a composition of 68.0 wt % Fe, 23.2 wt % Cr, 1.2 wt % Mo, 1.5 wt % W, 3.6 wt % B, 0.9 wt % C, 0.7 wt % Si, 0.8 wt % Mn.

9. The method according to claim 1 wherein applying said metallic alloy comprises welding.

10. The method according to claim 1 wherein applying said metallic alloy comprises thermal spray coating.

11. The method according to claim 1 wherein said metallic alloy has a coefficient of thermal expansion in the range of 12 to 17 ppm/° C.

12. A method for forming a metallic overlay comprising:

supplying a metal substrate with a thermal expansion coefficient "X";

supplying a metallic alloy which has a thermal expansion coefficient "Y", wherein said metallic alloy has a coefficient of thermal expansion "Y" greater than 15% of that of said substrate "X" and wherein said metallic alloy has a yield strength "Z" and wherein Fe and Cr comprises at least 90 wt % of said metallic alloy, and C is present at levels of about 1.0 wt %, and Mo is present at levels of about 1.0–2.0 wt %;

melting said metallic alloy and applying said metallic alloy to said metal substrate to form an alloy/substrate interface;

forming metallurgical bonds between said metallic alloy and said substrate at said alloy/substrate interface; and causing said alloy to shrink while said alloy is constrained at said alloy/substrate interface thereby developing a residual compressive stress in said metallic alloy, wherein said compressive stress does not exceed the yield strength "Z" and wherein said metallic alloy has a hardness of greater than about 850 kg/mm$^2$.

13. The method of claim 12 wherein said compressive yield strength is greater than about 1520 MPa at room temperature.

\* \* \* \* \*